(No Model.)
B. H. COLBY.
SLIDE RULE.
No. 543,612. Patented July 30, 1895.
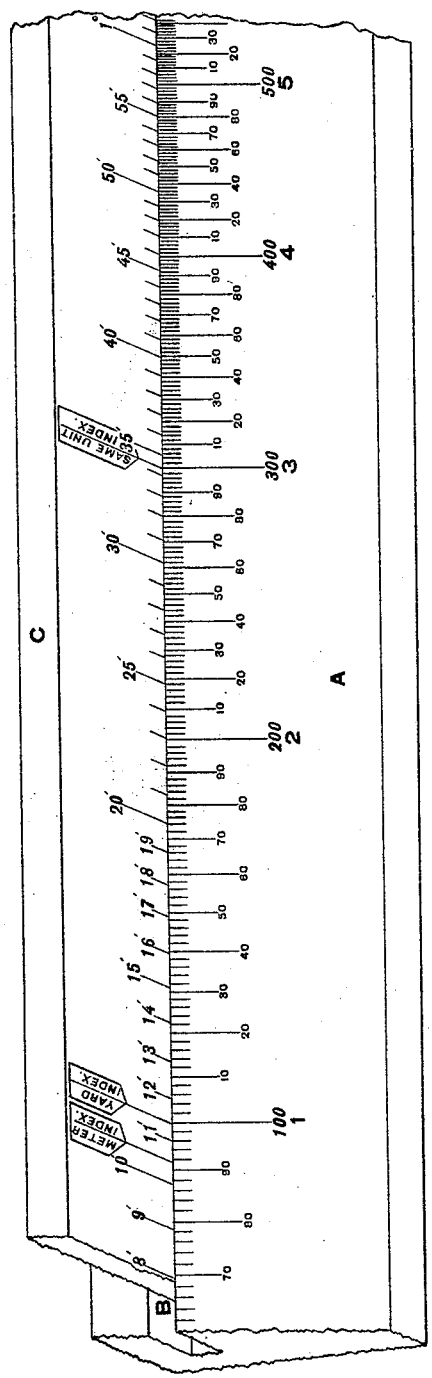
Witnesses
W. C. Alexander.
E. E. Vernell.
Inventor
B. H. Colby
By Attorneys
Fowler & Fowler

UNITED STATES PATENT OFFICE.

BRANCH H. COLBY, OF ST. LOUIS, MISSOURI.

SLIDE-RULE.

SPECIFICATION forming part of Letters Patent No. 543,612, dated July 30, 1895.

Application filed December 15, 1894. Serial No. 531,911. (No model.)

*To all whom it may concern:*

Be it known that I, BRANCH H. COLBY, a citizen of the United States, residing at the city of St. Louis, in the State of Missouri, have invented a certain new and useful Slide-Rule, of which the following is such a full, clear, and exact description as will enable any one skilled in the art to which it appertains to make and use the same, reference being had to the accompanying drawing, forming part of this specification.

My invention relates to a slide-rule for determining differences in elevation between two points when the stadia-reading and vertical angle between them are known.

This invention dispenses with a laborious trigonometric calculation of the difference of elevation between the points or obviates reference to cumbersome tables or diagrams to ascertain such differences of elevation.

The difference in elevation is commonly calculated by the following formula:

$$H = \frac{R'}{2R}(B-c-f)\sin. 2V + (c+f)\sin. V$$

in which R′ equals any reading of the stadia. B equals length of a measured base. R equals reading of stadia on the base. V equals angle of elevation or depression. c equals distance from center of instrument to center of object-glass. ƒ equals principal focal length of object-glass. (c+ƒ) equals 0.43 meters. H equals difference of elevation. This calculation has to be gone through with to ascertain the difference of elevation for each and every point. To obviate this elaborate tables and diagrams have been prepared from this formula for various stadia-readings and different vertical angles; but these tables and diagrams are inconvenient to handle and the result cannot be expeditiously ascertained therefrom. To obviate this I have devised the slide-rule hereinafter described, which gives the result required in a much quicker and easier way.

I shall now proceed to describe the slide-rule referred to.

In the form shown in the drawing, which, for convenience, represents but a portion of the slide-rule, it consists of a base part A, having preferably a groove B therein, in which slides a straight-edge C. The graduation of the different scales is shown in the drawing. For the scale upon the part A, I take consecutive numbers, ascertain the logarithms thereof, and plot these logarithms from the zero-point or from any given point to the scale of one (1) to twenty-four hundred hundred (2,400) or to any other convenient scale. This scale may be repeated as many times as may be desired or necessary, and is preferably repeated three times on part A, and made up of three sections, each section consisting of the logarithms of one (1) to one thousand (1,000) plotted to scale. I then set opposite these graduations the numbers themselves as often as may be convenient for the more rapid reading of the results sought. These graduations so numbered I use, first, to represent the stadia-distances as read upon the stadia-board when held vertically at the various points, and, secondly, to represent, when decimal point is properly placed, the differences in elevation sought.

The scale C, I denominate the "arc" or "angle" scale, inasmuch as it is the sca 'he graduations upon which correspond to the vertical angles or arcs of the points observed. The scale C may be graduated from the scale A. For instance, suppose it is required to locate the one (1°) degree point on the scale C. Let us assume the stadia reading or distance to be three hundred, (300.) We ascertain by computation from the formula above the difference in elevation when the stadia reading or distance is three hundred (300) and the vertical angle one (1°) degree. This we find to be five decimal twenty-four (5.24) and opposite the five hundred and twenty-four (524) point on the scale A. We mark on scale C the one (1°) degree point. Similarly other points for the different angles may be located on scale C throughout its entire length. Opposite the three hundred (300) point a line is marked on scale C, designated in the drawings as "same-unit index," which is the index-point, inasmuch as the graduations have been marked on the scale C when this point was opposite the three hundred (300) point. This index may be marked in the first instance after any one point has been located on scale C, and the scale C may be graduated from scale A for other angles when this index is set opposite any distance on scale A. All the graduations on scale C may, however, be located when the index is set at three hundred. (300) or at any other point. Before constructing the arc or angle scale C the differences in elevation for various angles and different distances are all calculated by above formula and the results tabulated.

Having graduated the scales as stated, suppose it is desired to obtain from the slide-rule the difference in elevation where the stadia-reading is three hundred (300) and the vertical angle one (1°) degree, the reverse of the supposition made above in graduating the scale C. By putting the same-unit index opposite three hundred (300) we note opposite the one (1°) degree mark five hundred and twenty-four, (524.)

It will be noticed that in graduating scale C for a difference in elevation of five decimal twenty-four (5.24) the graduation was located at five hundred and twenty-four, (524;) but it is to be borne in mind in this connection that we are now dealing with numbers corresponding to logarithms, and that, therefore, it is merely a question as to where to put the decimal point of the number. We know that for a distance of three hundred (300) and an angle of only one (1°) degree that the difference in elevation cannot be five hundred and twenty-four, (524,) nor can it possibly be as much as fifty-two decimal four, (52.4.) We know, as a matter of fact, that it should be about five (5) or thereabouts, so the decimal point is put between the five (5) and two (2) and five decimal twenty-four (5.24) we find to be the difference in elevation from the slide-rule. If we calculate by formula the difference in elevation for a distance of three hundred (300) and angle of one (1°) degree we shall find it to be five decimal twenty-four, (5.24.)

It will be obvious that instead of plotting the scale C from scale A, as described, that the scale C may be plotted independently of the scale A. For instance, take the example above given to locate the one (1°) degree point on scale C. Ascertain the logarithm of five decimal twenty-four, (5.24,) which has been found by calculation from the formula to be the difference in elevation when the stadia reading or distance is three hundred (300) and vertical angle is one (1°) degree. Plot the logarithm of this number on scale C from a given or zero point to the scale of one (1) to twenty-four hundred, (2,400,) or to any other scale to which scale A is plotted, and it will be manifest that the one (1°) degree point will be located on scale C at a point opposite five hundred and twenty-four (524) on scale A, the same point at which it was located by plotting scale C from scale A. Similarly all other points may be located on scale C for various angles independently of scale A. The point opposite three hundred (300) on scale A is in this instance marked on scale C, as before, to locate the index-point. It is more convenient to plot scale C from scale A, as the logarithms of successive numbers, the different required distances, have already been plotted upon scale A.

It may appear confusing and paradoxical to an unskilled person that in plotting the logarithm of five decimal twenty-four (5.24) to the same scale as scale A we find it to come opposite the logarithm of five hundred and twenty-four (524) plotted on scale A; but it is to be remembered that the logarithm of five decimal twenty-four (5.24) and of five hundred and twenty-four (524) or of fifty-two decimal four (52.4) is the same, the characteristic only of the logarithm of these quantities being different. In using logarithms the mantissa or decimal part only (which is invariably called the logarithm) is dealt with, and the characteristic or whole number of the logarithm is neglected until pointing off the number corresponding to the logarithm with the decimal-point afterward.

To enable anyone to easily read the slide-rule, and to tell exactly where the decimal-point belongs without having to shift the decimal-point, as explained, I place upon the scale A, below the different hundred-marks representing stadia-distance readings, numbers to represent differences in elevation. Thus, under five hundred (500) is five, (5,) from which an unskilled person can read the difference in elevation, as five (5) plus a decimal, or, as in the case supposed, five decimal twenty-four, (5.24.) Take another example: Suppose the stadia-distance read between two points is three hundred and forty (340) feet and the vertical angle thirty (30') minutes; move the scale C until the same-unit index is opposite the given distance, three hundred and forty, (340;) then upon scale A, at a point opposite thirty (30') minutes, read two decimal ninety-eight (2.98) feet, the required difference in elevation.

The simple operation of setting an index opposite a number corresponding to a distance and then reading a number opposite a given graduation of arc or angle, is all that it is necessary to do in using this slide-rule.

This slide-rule is much more accurate than diagrams for obtaining differences in elevation, and is at least three times more rapid than the best tables for obtaining the same results. It gives twenty-five per cent. (25 %) of the required differences in elevation to the nearest thousandth of a foot; fifty per cent. (50 %) to the nearest hundredth of a foot; and all the differences within the probable error of the field-notes. It can be used by any person of ordinary intelligence after a few minutes instruction, and saves an enormous amount of mental labor.

The index previously referred to has been termed "the same-unit index," because it indicates differences in elevation in the same unit the stadia reading or distance is given in. Thus if the stadia reading or distance be in meters, the difference in elevation will be in meters, and if the stadia reading or distance be in feet the difference in elevation will be in feet, and so on.

It is sometimes desirable to obtain the difference of elevation in feet where the stadia reading or distance is given in meters or yards. To provide for this I place upon scale C two special indexes, one a meter-index and the other a yard-index. To locate these indexes—say the meter-index first—I set the same-unit index opposite any number—say four hundred, (400.) I then calculate the number of meters in four hundred (400) feet, and this I find to be one hundred and twenty-two, (122,) whereupon I mark on scale C the point opposite one hundred and twenty-two, (122,) which locates the meter-index.

For the yard-index I find by calculation how many yards there are in three hundred (300) feet, for example, which I know is one hundred, (100.) After having set the same-unit index opposite three hundred (300) I mark opposite one hundred (100) the yard index on scale C.

Suppose, now, it is required to find the difference in elevation in feet where the stadia reading or distance is one hundred (100) meters and vertical angle twenty-one (21') minutes. This I find to be two (2) feet by moving the meter index opposite one hundred (100) and noting the point on scale A opposite twenty-one (21') minutes.

Let it be required to determine the difference of elevation in feet where the stadia reading or distance is given in yards. Say it is required to find the difference in elevation where the stadia reading or distance equals one hundred and fifty (150) yards and the vertical angle is thirty (30') minutes. Move the yard-index until it registers with one hundred and fifty (150) and note the reading on scale A which is coincident with thirty (30') minutes—namely, three decimal ninety-three, (3.93.) These indexes also enable any number of feet to be reduced to meters, and meters to feet, and yards to meters or feet, &c. For instance, let it be required the number of meters in three hundred (300) feet. Set the same-unit index to coincide with three hundred (300) and read off on scale A opposite the meter-index ninety-one decimal five, (91.5,) the correct number of meters in three hundred (300) feet. So, too, read off opposite the yard-index, without moving scale C, if you wish, one hundred, (100,) the number of yards in three hundred (300) feet. Again, suppose it is desired to obtain the number of meters in one hundred (100) yards. Bring the yard-index opposite one hundred (100) and note opposite the meter-index ninety-one decimal five, (91.5,) the correct number of meters in one hundred (100) yards. For another example, let it be required the number of feet in one hundred (100) meters. Set the meter-index opposite one hundred (100) and read off opposite the same-unit index three hundred and twenty-eight, (328,) the correct number of feet in one hundred meters. Again, how many feet are there in one hundred and twenty-nine yards? Set unit-index opposite one hundred and twenty-nine (129) and read opposite the same-unit index three hundred and eighty-seven, (387,) the correct number of feet in one hundred and twenty-nine (129) yards.

The scales may be provided with any other special indexes desired in a similar way, which will be obvious from the foregoing explanation. So far as regards this special-index part of my invention, broadly considered, it is not necessary that these scales be limited to reducing distances of one unit to distances of another unit, as the scales may represent other values or units than distance units and be used to convert units or values of one denomination into units or values of another denomination.

After having graduated one slide-rule it is of course a comparatively simple matter to graduate another or reproduce them at small cost. I preferably make the scales of well-seasoned wood, and construct them so they will not warp and bind and interfere with the easy manipulation of the sliding part C. The upper face of the scale A may be made sloping, as shown in the drawing, so that it makes an obtuse angle with the scale C, thereby enabling the graduations and numbers on the scales to be more easily inspected and read.

In practice the scales are usually about fifty (50) inches long and an inch or two wide and of any desired thickness. To readily reproduce the scales I graduate them upon metal or other plates and print the scales and numbers upon the parts of the slide-rule, but other means may be employed for this purpose.

While I have described my invention as appertaining to a slide-rule, I regard as within the spirit of my invention a rule for obtaining the same results having rotary or oscillating instead of sliding parts. So, too, while I have described the scale C as sliding and the scale A as stationary, it is evident that the scale C may remain stationary and the scale A be made to slide—that is, the scales may be reversed. I have already constructed slide-rules after this latter plan, but prefer the form of slide-rule herein illustrated.

I am aware that a logarithmic scale used in conjunction with an arc scale has been employed before, but the arc scale previously so used consists of the logarithmic sines and tangents of angles, whereas the divisions on my arc or angle scale, although graduated in division of arc for convenience, represent the logarithms of numbers corresponding to differences in elevation calculated from the aforementioned formula.

What I desire to claim and secure by Letters Patent of the United States as my invention is—

1. A slide rule having two scales, the divisions on one corresponding to the logarithm of successive numbers and representing stadia distances or readings, and the divisions on the other corresponding to the logarithms of numbers representing differences of elevation for various distances and different vertical angles, and an index therefor, substantially as described.

2. A slide rule having a logarithmic scale, the divisions on one corresponding to the logarithms of consecutive numbers and representing distances, and the divisions on the other corresponding to the logarithms of numbers representing differences of elevation for various distances and different vertical angles, of an index therefor, and suitable other indexes of other denominations, whereby the distances may be given in one unit and the elevation read in another, substantially as described.

3. A slide rule having two scales, the division on one corresponding to the logarithms of successive numbers and representing readings from a stadia board when held vertically at observed points, and the divisions on the other corresponding to the logarithms of numbers representing differences of elevation for various distances and different vertical angles, and an index therefor, substantially as described.

In testimony whereof I have hereunto set my hand and affixed my seal, this 12th day of December, 1894, in the presence of the two subscribing witnesses.

BRANCH H. COLBY. [L. S.]

Witnesses;
A. C. FOWLER,
J. P. WESTON.